UNITED STATES PATENT OFFICE.

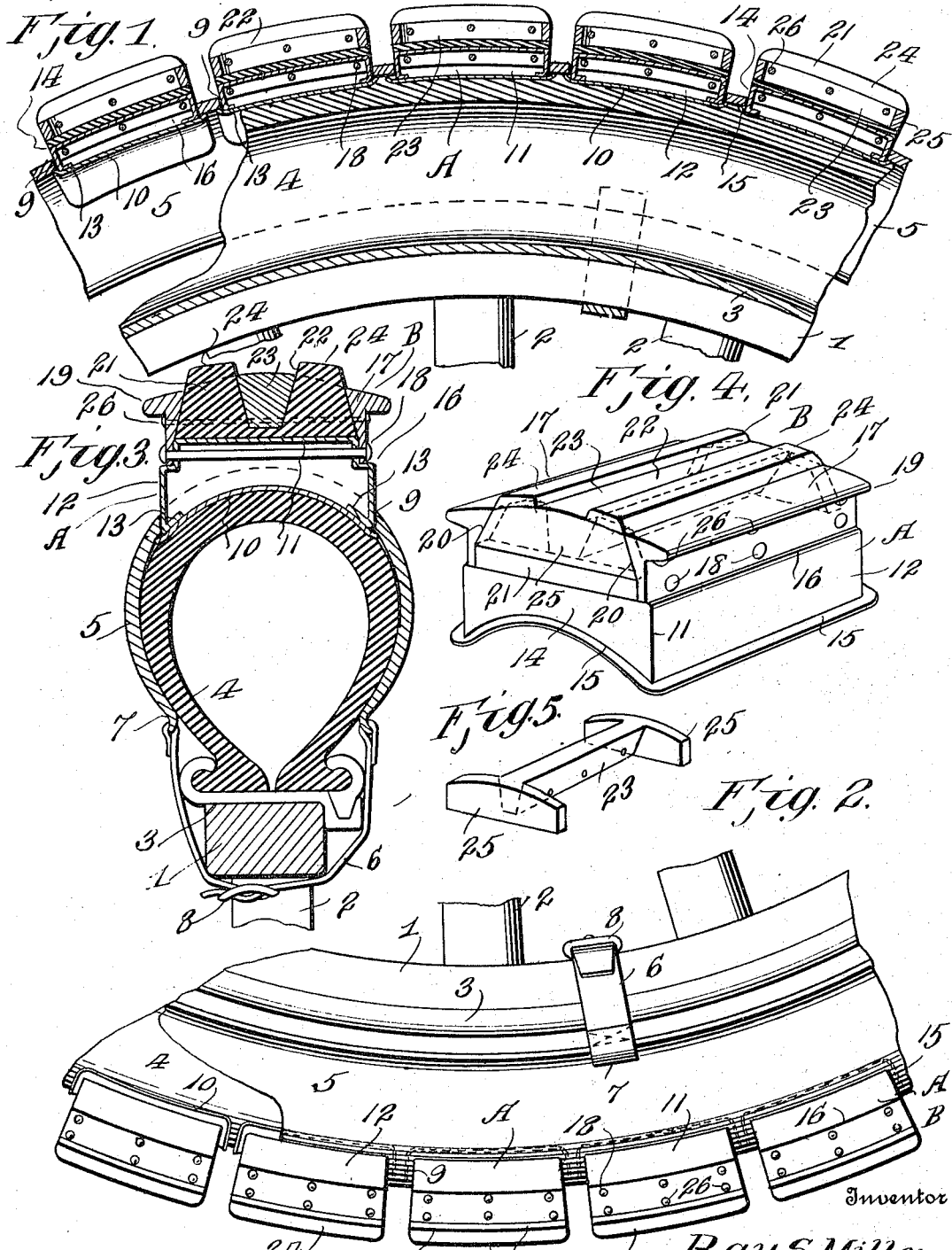

RAY S. MILLER, OF RED SULPHUR SPRINGS, WEST VIRGINIA.

AUTOMOBILE-TIRE PROTECTOR.

1,192,924.      Specification of Letters Patent.      Patented Aug. 1, 1916.

Application filed April 10, 1914. Serial No. 831,021.

*To all whom it may concern:*

Be it known that I, RAY S. MILLER, a citizen of the United States, residing at Red Sulphur Springs, in the county of Monroe and State of West Virginia, have invented new and useful Improvements in Automobile-Tire Protectors, of which the following is a specification.

This invention relates to tire protectors, the object in view being to provide reliable means for fully protecting a pneumatic tire from being punctured and otherwise injured so that it is subject to blow outs and the like, the said protector embodying an inclosing metal case for the pneumatic tire, combined with tread section supporting saddles which work through openings in the metal casing and which are supported directly by the pneumatic tire and limited as to their outward and inward movements by said metal casing.

With the above and other objects in view, the invention consists in the novel construction, combination and arrangement of parts, as will be hereinafter more fully described, illustrated and claimed.

In the accompanying drawings: Figure 1 is a longitudinal section through a portion of a pneumatic tire and also through the protector of this invention. Fig. 2 is a side elevation of the same partly broken away. Fig. 3 is a cross section through the tire and protector. Fig. 4 is a detail perspective view of one of the saddles, including a tread section and retaining means therefor. Fig. 5 is a detail view of one of the tread section retainers.

Referring to the drawings 1 designates the felly of a wheel, 2 the spokes, 3 the tire holding rim and 4 the outer case of a pneumatic tire all of said parts being of the usual construction and arrangement at present in use.

In carrying out this invention I employ a metal protecting case 5 which may be composed of sheet metal and which extends practically all the way around the tire longitudinally and transversely so as to protect the tread surface of the tire 4 as well as the side walls thereof. This metal protecting case 5 may be secured to the wheel in any convenient manner and for that purpose I have shown fasteners in the form of straps 6 which are passed through slots 7 in the opposite marginal edges of the case 5, each strap being provided with a buckle 8. Any other suitable means may, however, be employed to fasten the metal casing 5 in place on the tire 4. The edges of the casing 5 are preferably curved or rolled outwardly as shown in Fig. 3 to avoid injuring the tire.

The metal casing 5 is provided with openings 9 extending through the same and in each of said openings is placed a saddle designated generally at A, said saddle carrying a section B of the elastic tread hereinafter more particularly described. In the preferred embodiment of the invention, each saddle A is of hollow construction and preferably formed of sheet metal, comprising a base plate 10 and a main body 11 which is extended to form the side walls 12 of the saddle as illustrated in Fig. 3. The side walls 12 are turned inwardly as shown at 13 to provide broad surfaces for welding or otherwise fastening the same to the plate 10 and the marginal edge of the plate is extended in all directions beyond the side walls 12 and end walls 14 of the saddle to provide inside stop flanges 15 which are adapted to bear against the inside of the metal casing 5 to prevent the outward escape of the saddle. The side walls 12 are inwardly offset as shown at 16 in the form of rabbets to receive a pair of oppositely located tread holding flanges 17, the same being fastened to the body of the saddle by bolts 18. The tread holding members 17 are also provided with the outwardly extending stop flanges 19 which by coming in contact with the metal casing 5 limit the inward movement of the saddles.

The inner faces of the tread holding flanges 17 are undercut as shown at 20 to receive the correspondingly beveled side faces of a tread section 21 which is illustrated in cross section in Fig. 3. Each tread section is in the form transversely of a double wedge, being provided with a centrally depressed seat or groove 22 extending longitudinally of the tire for the purpose of receiving the tread section retaining means which consists of a bar 23 extending lengthwise of and located in the seat 22, the outer surface of the bar 23 lying below the plane of the working surfaces of the ribs 24 formed by producing the depressed seat 22 as shown in Fig. 3. The tread sections may be of rubber or other suitable material.

At its opposite extremities the retaining bar 23 is provided with the end cross bars 25 which extend across the corresponding ends of the body of the saddle and form end abutments to prevent the longitudinal shifting of the tread section, transverse shifting of said section being prevented by engagement between the slanting extremities of the bars 25 and the tread holding flanges 17. Bolts 26 are inserted transversely through the tread section, the tread holding flanges 17 and the central bar 23 of the tread retainer, thereby fastening all of said parts together as shown in Fig. 3. The extreme marginal edge of the inside stop flange 15 is preferably rounded outwardly as shown in Fig. 2 to prevent said stop flange from chafing and injuring the tire 4.

From the foregoing description it will now be understood that the metal casing 5 practically incloses and thereby fully protects the pneumatic tire, avoiding all danger of punctures and blow outs. Each of the saddles is movable independently of the remaining saddles through its respective opening in the metal casing 5 and each saddle is independently supported directly by the pneumatic tire and the outward and inward movements of each saddle are limited by the stop flanges above described. A new tread section may be provided as frequently as may be necessary so that any part of the protector may be renewed quickly and easily. Should the tire become deflated from any possible cause, the saddles will be effectively supported by the metal casing 5 so as to prevent permanent injury to the outer case and inner tube of the pneumatic tire.

What I claim is:—

A protector for pneumatic tires comprising an endless circular metal casing conforming generally to the shape of the tread surface and side walls of a tire and formed with rectangular openings in the tread wall thereof, and rectangular saddles seated in said openings and each being of hollow construction and formed of sheet metal, comprising a base plate, a main body extended to form the side and end walls of the saddle, the inner edges of said walls being bent inwardly to provide flanges by which the body is secured to the base plate, said base plate being of greater dimensions than the saddle-receiving opening in the protector casing, the side walls of the saddle body being inwardly offset to form rabbets, oppositely located tread-holding flanges seated in said rabbets, fasteners inserted through the saddle body and said flanges, and outwardly extending stop flanges on said tread-holding flanges adapted to contact with the protector casing to limit the inward movement of the saddle.

In testimony whereof I affix my signature in presence of two witnesses.

RAY S. MILLER.

Witnesses:
R. E. CUNNINGHAM,
C. MARSHALL.